United States Patent Office 2,849,942
Patented Sept. 2, 1958

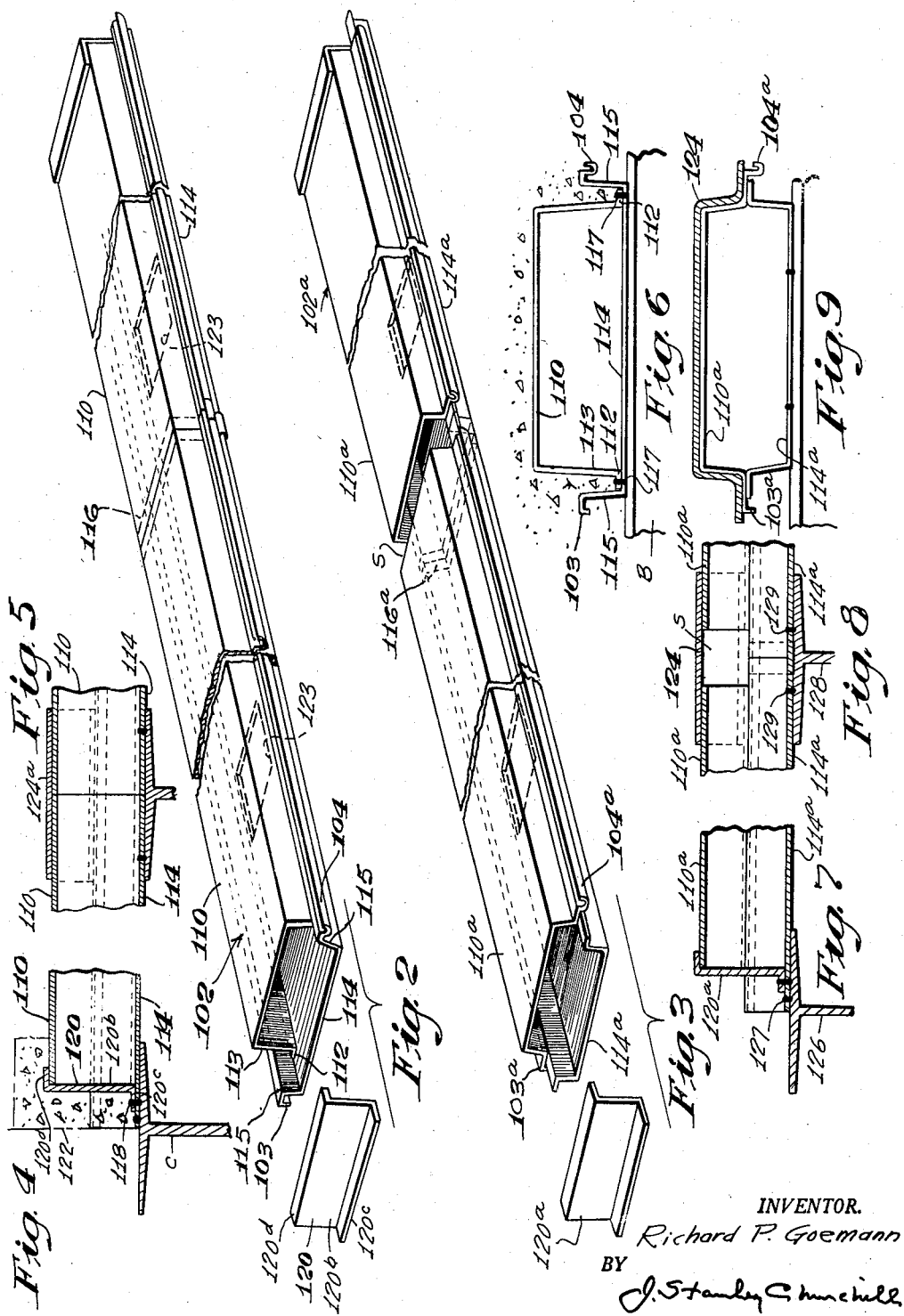

2,849,942

MULTI-STORIED BUILDING AND AIR CONDITIONING STRUCTURE

Richard P. Goemann, Port Washington, N. Y., assignor to H. H. Robertson Company, Pittsburgh, Pa., a corporation of Pennsylvania Original application February 24, 1954, Serial No. 412,217, now Patent No. 2,729,429, dated January 3, 1956. Divided and this application September 6, 1955, Serial No. 532,437

3 Claims. (Cl. 98—31)

This invention relates to a multi-storied building having a novel air condition and distributing system.

One object of the invention is to provide a novel construction of multi-story building wherein provision is made for distributing air from supply ducts in the service core through cellular floors constituting the load supporting floor structure of the building in a novel, economical and practical manner, such as to minimize the space requirements for ducts and other accessories in spaces between the floors and the ceilings immediately below the same.

A further object of the invention is to provide a novel building structure of the character described wherein at least some of the load supporting floors of the building comprise the cellular metal floors illustrated in the United States patent to Young, No. 1,867,433, granted July 12, 1932, and wherein provision is made for distributing air from air supply ducts in the service core throughout the building utilizing the cells of the structural floor modified so as to effect distribution of the air in a novel manner and with minimum air leakage therefrom, and one wherein the space requirements between the ceiling of one story of a building and the floor of the next higher story are reduced to a minimum.

A still further object is to provide novel and improved means for closing, sealing and rendering the selected air conducting cells forming a portion of the cellular floors airtight, enabling the practical distribution of the conditioned air to selected parts of the building to air condition the same.

With these general objects in view and such others as may hereinafter appear the invention consists in the novel and improved air condition and distributing system and in the novel means for sealing the selected air conducting cells forming a part of the cellular floor to enable the conditioned air to be distributed therethrough to selected parts of the building to air condition the same, all as hereinafter described and particularly defined in the claims at the end of this specification.

In the drawings illustrating the preferred embodiment of the present invention:

Fig. 2 is a perspective view showing in detail one form of air conducting flooring cell that may be used in the system of Fig. 1 and showing one of the end closure plates separated therefrom;

Fig. 3 is a similar view of a modified form of air conducting flooring cell;

Fig. 4 is a cross sectional detail view of one end of the cell of Fig. 2 shown supported upon and connected to a girder and showing the end closure plate in position;

Fig. 5 is a cross sectional detail view of a portion of a cell of the kind shown in Fig. 2 illustrating the ends of two abutting cell units joined in abutting relation and connected to a cross beam and with a cover plate overlying the ends of the upper member of the units;

Figure 1:
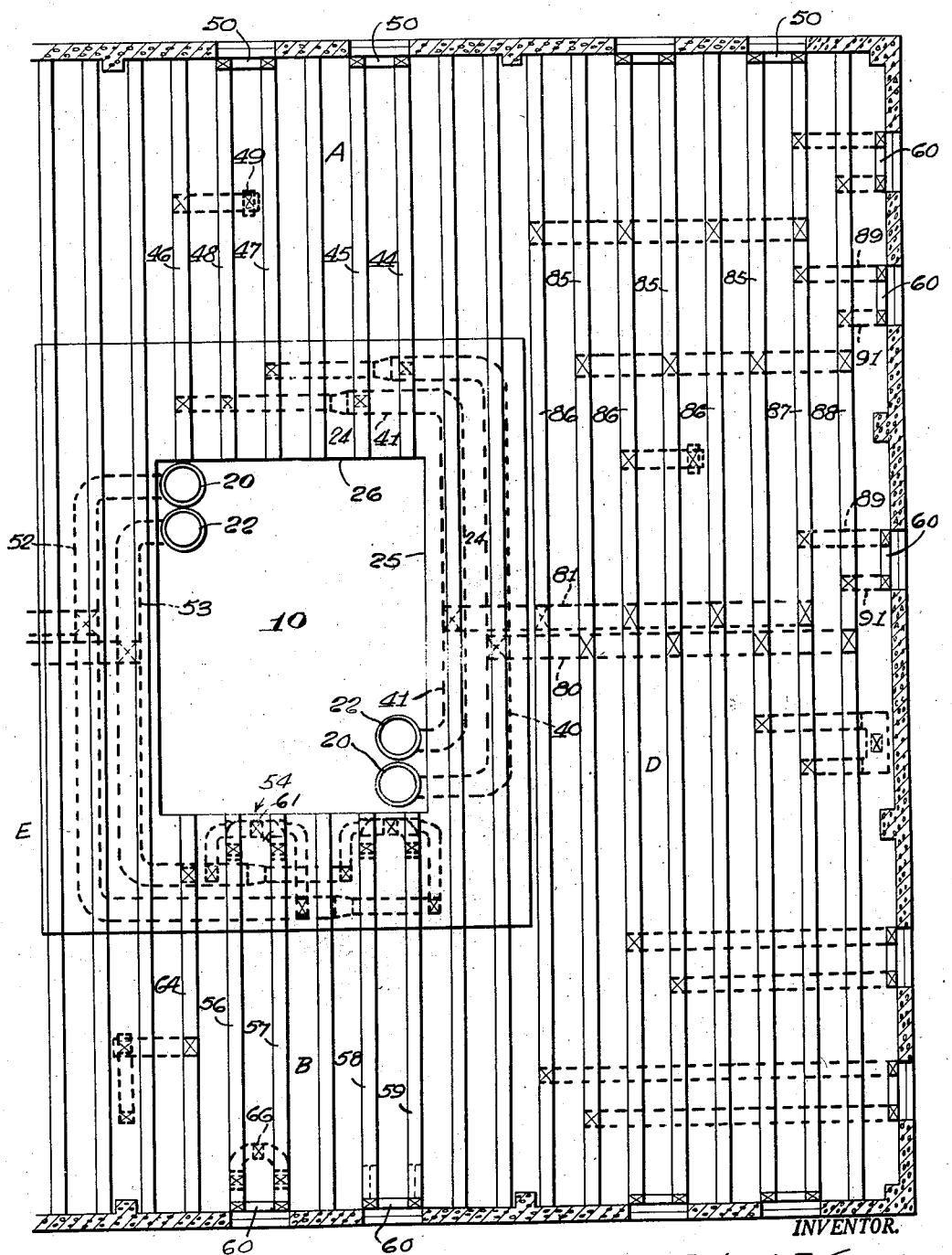
Fig. 1 is a more or less diagrammatic plan view of one story of a multi-story building embodying the present air conditioning system.

Fig. 6 is an end view of a cellular duct unit, such as shown in Fig. 2, supported upon a girder; and Figs. 7, 8 and 9 are cross sectional detail views of the modified form of the air conducting cell shown in Fig. 3, Figs. 7, 8 and 9 corresponding to Figs. 4, 5 and 6 of the cell shown in Fig. 2.

The present invention is directed to a component of the complete multi-storied and air conditioned structure disclosed in my copending application, Serial No. 412,217, filed February 24, 1954, and now Patent No. 2,729,429, granted January 3, 1956, of which the present application is a division.

As more fully disclosed in application, Serial No. 412,217, now Patent No. 2,729,429, the apparatus and system which has been illustrated as embodied in an air conditioning and an air distributing system, particularly in a multi-story building, may under varying conditions of operation serve the several purposes of ventilation, exhausting air from within the building, for heating a part or all of the building, for cooling a part or all of the building and for general air conditioning purposes. For convenience of description the apparatus and system will be at times referred to herein as an "air conditioning and distributing system."

The present invention may be embodied in a multistory building in which provision is made for distributng air through a cellular load supporting floor structure in a novel manner such that economies in space between a particular floor at one story and the ceiling of the next story below may be effected, and as a result the framework of the building may be limited to the minimum height required to produce a predetermined number of stories of the building, each of a predetermined height from floor to ceiling.

The present air conditioning systems for multi-story buildings now on the market embody ducts at each floor where it is desired to effect the air conditioning. These ducts are of relatively large cross sectional dimension and occupy a substantial space when interposed between the floor and ceiling and are designed to conduct so-called "primary air" from a source of supply, usually located in the basement of the building through risers in the usual service core of the building and then through such relatively large distributing ducts between the ceiling and floor to specially designed outlet boxes usually disposed around the periphery of the building and below the windows of the building. These outlet boxes are usually provided with heating or cooling coils, and in the operation of such systems the air within the building or within the particular room or portion of the building in which the sill boxes are located is caused to circulate through the sill boxes by induction caused by the flow of primary air through a special orifice or device in the sill box. In other words the prior art systems all embody at each story, air ducts running beneath the floor and between it and the ceiling of the story below, and the successful operation of the system depends upon the conditioning of the air in the sill boxes and the induction of the proper amount of air from within the room or portion of the building in which the sill box is located. Such an air distribution system in addition to the elaborate duct system and the height which is wasted by the ducts between the ceiling and the floor, as described, not only is less efficient in operation but also requires the distribution of water to the individual sill boxes from a source in the service core requiring a more or less tailor-made installation depending upon the location of the individual sill boxes and their distance from the service core. Such systems leave much to be desired in the way of flexibility and cost.

In general the present system seeks to eliminate the waste space above referred to between the ceiling and the floor in a multi-story building which, as stated, is required by the ducts of prior art air conditioning systems. This is accomplished by utilizing a cellular floor, such as that illustrated in the United States patent to Young, above referred to, as a component of the present air conditioning and distribution system by which both hot and cold air or by which cool air in different volumes or in different degrees of conditioning, or for heating or cooling purposes may be distributed in an economical, highly flexible and superior manner to outlets disposed not only around the periphery of the building but also at selected intermediate locations, and which may discharge either into the building upwardly through suitable outlet boxes or downwardly through ceiling outlets into the story next below.

In order to efficiently distribute the conditioned air or any volume of air from a source of supply through selected of the flooring cells the cells must be sealed at their sides and ends to prevent escape of the air and to enable a constant volume and velocity of air to flow therethrough. In accordance with the present invention novel means are provided to accomplish this result.

Referring now to the drawings and particularly to Fig. 1 which illustrates in plan view a sufficient portion of one of the floors of a multi-story building embodying the present air conditioning and distributing systems to enable the invention to be understood, 10 represents the usual building service core or vertical shaft which may extend upwardly from the basement of the building to the upper story thereof and through which elevators and other services are extended from the basement and which may be distributed to the desired locations within the building.

For purposes of illustration the air conditioning and distributing system is herein shown as comprising a system in which provision is made for conducting a supply of heated air upwardly through one set of risers or vertical supply ducts 20 located at opposed corners of the service core, and cold air is conducted upwardly through a second set of risers or vertical supply ducts 22 similarly located. Customarily in multi-story buildings a corridor indicated at 24 is arranged to extend along at least one side 25 and one end 26 of the service core or vertical shaft 10, and in most instances such a corridor extends completely around the service core. Hot and cold air is supplied to selected of a plurality of the cells in the portions of the floor opposite the ends of the service core, and which portions are designated A and B in Fig. 1, through duct connections, as will be described, from the respective sets of the hot and cold air risers 20, 22 in the service core. In order that the major portion of the portions A and B of the building may be of maximum height between ceiling and floor I prefer to run the connecting ducts or headers 40, 41 from one set of hot and cold air risers 20, 22 through the sections of the corridor along one side and one end of the service core. As shown in Fig. 1, the hot and cold air connecting ducts 40, 41 are hung at near the ceiling of the corridor and are interconnected as indicated by the mark X in Fig. 1 to selected floor ducts 44, 45 and also to as many other similar ducts as 47, 48, depending upon the window spacing at the part of the periphery of the building to which the floor cells run from the end of the corridor. As indicated in Fig. 1, the part of the ducts 40, 41 beyond the connector to the floor cells 44, 45 may be reduced in sectional dimensions, and as indicated, the cold air duct 41 may be connected to a separate floor cell 46 from which cold air may be discharged through an outlet 49 at a point midway between the corridor and outer wall of the building as shown. From the inspection of Fig. 1 it will be seen that the hot and cold air may be conducted through any number of the selected floor cells to distribute the air to near the outer building wall, preferably at the windows. The separate supplies of hot and cold air are separately discharged from the floor cells and mixed in the outlet boxes 50 erected at and immediately below the window openings at the outer wall of the building so that air of the desired temperature may be discharged into the room at the various outlet locations.

Also as illustrated in Fig. 1, provision is made for distributing air to the portion B of the building, and for purposes of illustration a system is shown wherein the hot and cold air is mixed to a predetermined temperature before being introduced into the floor cells. As shown in Fig. 1, air streams from the second set of the hot and cold air risers 20, 22 located in the opposite corner of the service core are led through distributing ducts 52, 53 into specially designed mixing chambers 54 erected in the part of the corridor along the second end of the service core, as illustrated in Fig. 1, so that from the mixing chambers 54 air of the required temperature may be introduced through connecting ducts 61 into selected and spaced floor cells 56, 57 and 58, 59 running from the corridor in a direction at right angles to the end of the service core and terminating under windows at the periphery of the building where the air is discharged from outlets 60 into the room. As shown in Fig. 1, the cold air may be connected to a separate floor cell 64 from which cold air may be discharged at one or more points intermediate the corridor and the outer wall of the building. In some instances selected cells 56, 57, 58, 59 may be connected to any suitable ceiling outlets 66 from which the air may be discharged into the building at the story below the floor.

In order to distribute the hot and cold air from two sets of the connecting ducts 40, 41 located in the corridor to the portions of the building indicated generally at D and E wherein the floor cells extend parallel to the sides of the service core 10, it is preferred to employ a pair of air supply header ducts 80, 81, as shown in Fig. 1, connected to selected floor cells in each of the portions of the floor D and E. For illustrative purposes the system of air distribution has been shown and will be described only for the section D of the floor. These header ducts 40, 41 may be connected with the hot and cold air risers 20, 22, as indicated in Fig. 1, and the hot air is led into selected, and as herein shown, alternate floor cells 85 and the cold air led into intermediate and alternate floor cells 86. The header ducts 80, 81 are preferably extended to the two outer floor cells 87, 88 nearest the wall of the building so that the hot and cold air may be distributed lengthwise of the outer wall, and connection is preferably made at each window location by conduits 89, 91 from these distributing cells 87, 88 to outlet boxes indicated at 60 located at some of the windows.

From an inspection of Fig. 1 it will be observed that in the upper portion of the section D of the floor I have illustrated one arrangement of air distributing ducts in which the floor cells 86 are interconnected by a duct 92 and the floor cells 85 are interconnected by a duct 93, and in the lower section of the portion D of the floor I have illustrated a different arrangement of distributing ducts for distributing the air to the sill boxes wherein separate floor cells 85 and 86 are connected to separate pairs of ducts 96—96, 97—97, and 98—98. It will be understood that this showing is for illustrative purposes only, and in some instances I may prefer to utilize either system in the entire portion D of the floor and also in the entire portion E of the floor.

From the description thus far of the general construction and mode of operation of the present multistoried and air conditioned structure it will be observed that it is desirable to minimize leakage of air from the air conducting floor cells.

While the structure of the conventional multicellular metal floor illustrated in the Young Patent No. 1,867,433 above referred to has been used for carrying wires and may be used to conduct the conditioned air to the various outlets above referred to, it is preferred to erect the floor utilizing with alternate conventional multicellular units, as shown in said Young Patent No. 1,867,433, a series of air carrying units 102, Fig. 2, having a single enlarged cell of a sectional dimension such as to conduct a relatively large volume of air therethrough. This cell unit 102 is preferably of a width equal to one half the width of a conventional multicellular unit and is preferably constructed with male and female lips 103, 104 at the margins thereof for cooperation with corresponding lips on the margins of the conventional units. For example, the conventional multicellular floor units may have four cells spaced six inches on centers with an overall width of twenty-four inches between the center lines of the marginal lips while the illustrated single air carrying cell 102 may be twelve inches in overall width between the center lines of the marginal lips. In the preferred construction of the floor for the embodiment in a multi-story building embodying the invention, the single cell air carrying units 102 are erected in alternate relation to the conventional multicellular units. Any of the floor cells such as 44 to 48, etc., may be of the specific construction embodied in either of the units 102 or 102a shown in Figs. 2 to 9, it being understood that the conventional ducts referred to hereinbefore have been omitted from Fig. 1 in the interest of simplicity in illustration. In this manner it is possible to maintain the desired electrical wiring potential of the floor without detracting from the use of the floor for conducting the conditioned air to the various outlets discharging into the various parts of the building at a particular story thereof or downwardly through ceiling outlets to the story below. As best illustrated in Figs. 2, 4, 5 and 6, the improved air carrying cell unit 102 may and preferably will comprise an upper member 110 of substantially inverted U shape having flanges 112 at the marginal portions of the legs 113 thereof. The inverted and flanged U-shaped upper member 110 is adapted to fit within the generally U-shaped lower member 114 to provide space between the legs 115 of the lower member and the legs 113 of the upper member so as to enable the flanges 112 and the lower member 114 to be held to a supporting beam B by welds 117 as shown in Fig. 6. Preferably, the end of each upper section 110 terminates a short distance from the end of the lower section 114 so as to permit the end of the lower section at the wall of the building to be closed and sealed by flanged end sealing members 120 which may be welded at 118 to the bottom section 114 and to the supporting beam C as shown in Fig. 4. As shown, the ceiling member 120 comprises a vertical web 120b having flanges 120c and 120d extending from the ends thereof in opposite directions. The flange 120c engages the inner surface of the lower member 114 and the flange 120d engages the outer surface of the upper member 110. The flanged sealing members 120 may be caulked with cementitious sealing compound and the concrete floor fill 122 further assists in sealing the ends of the cells. In erecting the floor, the upper sections 113 and the lower sections 114 of the air carrying cellular units are erected in end abutting relation, as is shown in Fig. 2, and the joints between the upper members 110 are sealed by a cover plate 124a, Fig. 5. The joints between abutting lower sections may be taped and sealed by a suitable cementitious sealing compound, Fig. 2, as indicated at 116, so as to reduce possibility of air leakage to a minimum. Conditioned air may enter and leave the flooring cell units 102 through suitable openings in either the upper member 110 or 114, depending upon the manner in which the unit 102 is used. For illustrative purposes, openings 123 have been shown in the member 114, said openings being suitable for establishing intercommunication with air supply ducts such as 40 and 41, crossover ducts 80 and 81, etc.

Figs. 3, 7, 8 and 9 illustrate a modified cell unit 102a in which the upper members 110a are provided with marginal male and female flanges 103a and 104a similar to the flanges 103 and 104, and the lower members 114a are provided with lateral flanges 103b and 104b which engage the upper members 110a at a point inwardly of the flanges 103a and 104a, as is clearly shown in Fig. 9.

The upper members 110a are of less length than the lower members 114a so that a space S, Fig. 8, is formed between the ends of adjacent members. In assembling the members 110a and 114a, the outermost ends of the upper members 110a are set back from the corresponding ends of the lower members 114a and the open ends of the cell unit 102a are closed by flanged sealing members 120a similar to the members 120. The adjacent ends of the lower members 114a at intermediate joints abut and are sealed by tape and sealing compound indicated at 116a. At the intermediate joints where the ends of the upper members 110a are cut back and the ends of the lower sections abut one another, the lower sections are preferably welded to the beams 128, as indicated at 129 in Fig. 8, and cover plates 124 are installed and sealed to the ends of the upper sections 110a, as illustrated in Figs. 6 and 9. The outermost end portions of the members 114a are welded to beams 126, as indicated at 127. In practice both tape and sealing compounds 116a may be used with advantage to insure air-tight air carrying cells at all joints between adjacent sections.

This application is a division of my copending application, Serial No. 412,217, filed February 24, 1954, and now Patent No. 2,729,429, granted January 3, 1956.

Having thus described the invention, what is claimed is:

1. In a building structure, a frame, a metallic cellular load supporting floor erected on the frame, said cellular metal floor comprising a plurality of cellular units erected in longitudinal and aligned relation defining cells for air flow therethrough, sealing means for sealing the end joints between adjacent endwise aligned cellular units, means for closing the ends of the endmost units in an aligned series of units, means for introducing air under pressure into selected of said floor cells to effect the flow of air through the aligned cells, and outlet means through which the air is discharged from said cells into the building, each of said aligned cellular units comprising an upper and lower member, one of said members being provided with marginal flanges adapted to interengage with other units, said upper member being U-shaped and said cellular units being assembled with the upper member in inverted relation to the lower member, the upper member being of less length than the lower member and having its ends terminating a short distance from the ends of the lower member.

2. In a building structure, a frame, a metallic cellular load supporting floor erected on the frame, said cellular metal floor comprising a plurality of cellular units erected in longitudinal and aligned relation defining cells for air flow therethrough, sealing means for sealing the end joints between adjacent endwise aligned cellular units, means for closing the ends of the endmost units in an aligned series of units, means for introducing air under pressure into selected of said floor cells to effect the flow of air through the aligned cells, and outlet means through which the air is discharged from said cells into the building, each of said aligned cellular units comprising an upper and lower U-shaped member, one of said members being provided with marginal flanges adopted to interengage with other units, said units being assembled with the upper member in inverted relation to the lower member, the upper member being of less length than the lower member and having its ends terminating a short distance from the ends of the lower member and providing a space therebetween, the projecting portions of the lower members being welded to the frame, and the spaces between the adjacent ends of the upper members being closed by said closing means and which means is shaped to conform to and fit over said upper members.

3. In a building structure, a frame, a metallic cellular load supporting floor erected on the frame, said cellular metal floor comprising a plurality of hollow, elongated cellular units erected in longitudinal and aligned relation defining cells for air flow therethrough, sealing means for sealing the end joints between adjacent endwise aligned cellular units, means for closing the ends of the endmost units in an aligned series of units, means for introducing air under pressure into selected of said floor cells to effect the flow of air through the aligned cells, said endmost units having a top and bottom wall with the top wall terminating short of the end of the bottom wall, and outlet means through which the air is discharged from said cells into the building, said means for closing the ends of the endmost units comprising a member having a vertical web and upper and lower flanges extending in opposite directions from said web, the upper flange engaging the upper outer surface of the top wall of the unit and the lower flange being secured to the inner surface of the bottom wall of the unit.

References Cited in the file of this patent

UNITED STATES PATENTS

| | | |
|---|---|---|
| 220,765 | Linford | Oct. 21, 1879 |
| 1,974,767 | Clark | Sept. 25, 1934 |
| 2,081,197 | Goeller | May 25, 1937 |
| 2,125,366 | Young et al. | Aug. 2, 1938 |
| 2,182,686 | Young | Dec. 5, 1939 |
| 2,184,113 | Calafati | Dec. 19, 1939 |
| 2,192,567 | Waugh | Mar. 5, 1940 |
| 2,206,119 | Persons | July 2, 1940 |
| 2,641,449 | Antony | June 9, 1953 |